May 26, 1942.

2,283,901

Filed March , 1940

WITNESSES:
James F. Mosser
Andrew J. Cask.

INVENTOR
EDWIN E. ARNOLD.
BY
A. B. Reavis
ATTORNEY

May 26, 1942.  E. E. ARNOLD  2,283,901
TURBINE BLADING
Filed March 16, 1940  2 Sheets-Sheet 2

WITNESSES:
James K. Mosser
Andrew J. Cask

INVENTOR
EDWIN E. ARNOLD.
BY
A. B. Reavis
ATTORNEY

Patented May 26, 1942

2,283,901

UNITED STATES PATENT OFFICE 2,283,901

TURBINE BLADING

Edwin E. Arnold, Pittsburgh, Pa., assignor to Westinghouse Electric & Manufacturing Company, East Pittsburgh, Pa., a corporation of Pennsylvania Application March 16, 1940, Serial No. 324,271

7 Claims. (Cl. 253—77)

My invention relates to turbine blading and it has for an object to provide a row of blades comprising a circumferential series of groups wherein each group includes a plurality of blades brazed together to provide for increased strength and durability.

It has been found that turbine blades occasionally fail on account of excessive stresses which may be developed on account of impact or vibration effects. In accordance with the present invention, instead of each blade of a row acting as an individual unit, the row is made up of a circumferential series of groups of blades, each blade having integral shroud and root portions and the adjacent shroud and root portions of the blades of each group being brazed together. Hence, the natural frequency is increased and a larger root portion is effective to resist forces applied to the mutually reenforced blade elements. The invention is particularly applicable for the initial row or rows of moving impulse blades of a turbine of the high-temperature and high-pressure type in that the composite blade groups effectively resist the relatively large impact forces encountered and the increase in frequency further safeguards against resonance effects at normal operating speeds.

Preferably the blades are connected together in groups of two or more by copper or alloy brazing, which connects both the shroud and the root portions of the blades. Furthermore, as I prefer to use blades having both root and shroud portions provided with similarly formed abutting faces, it is possible to have such relation of the root and shroud portions that the brazing of adjacent blades may be located in a neutral zone, or, in the case of flat faces, in a plane where bending stresses are at a minimum.

I find that, where copper or a proper alloy is used as the brazing material, not only may the groups be subjected to heat treatment without impairing the brazed connections, but such connections serve their intended purposes under high temperature conditions of operation.

As the bonding layer of each blade group has a modulus of elasticity approximately one-half of that of the blades, when the blades of a group are deflected, such material undergoes a certain amount of shearing deformation with the result that, for a given deflection, the outermost fiber stresses of the blades are reduced over an integral twin blade construction, the effect of this being to reduce the maximum stresses of the blading with the result that the latter may endure an indefinite number of repeated stresses of higher deflection ratio without fatigue. In addition to the low elastic strata functioning in this way to enhance the durability of the blading, the brazing material functions to exert a damping effect. Also, as the brazing material connects the blades of each group as a unitary structure, the natural frequency is increased.

Accordingly, a further object of the invention is to provide a row of impulse blades comprising a circumferential series of groups, each group including a plurality of blades having the shroud and root portions provided with adjacent faces bonded together by means of brazing.

A further object of the invention is to provide an impulse blade row comprising a circumferential series of blade groups, the blades of each group being formed with shroud and root portions having adjacent faces bonded together by means of brazing, the flat faces and the brazing being arranged in a neutral zone or plane between the adjacent blade elements.

These and other objects are effected by my invention as will be apparent from the following description and claims taken in accordance with the accompanying drawings, forming a part of this application, in which:

Figure 3:
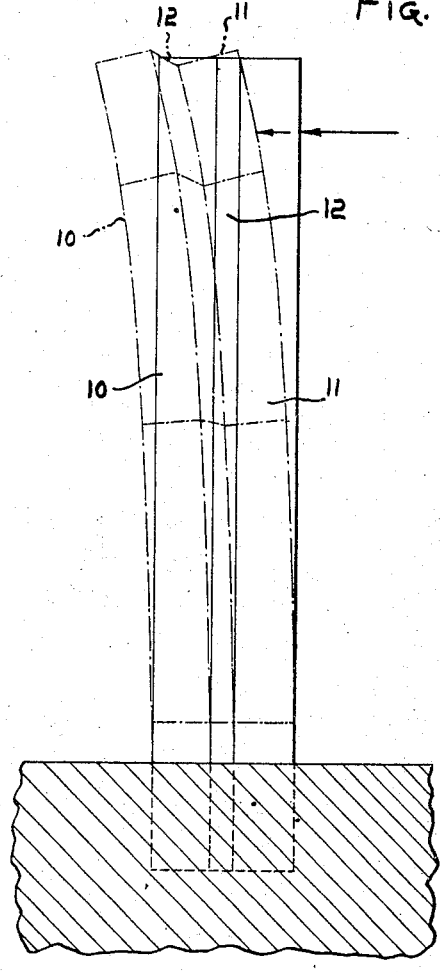
Fig. 3 is a diagrammatic view illustrative of principles involved in the improved blading; and, Figs. 4, 5, 6 and 7 show modifications wherein interlocking features are incorporated in the brazed connections of the shroud portions.

In order that the operative effect of the brazing of a blade group to reduce the outer fiber stresses may be better understood, reference is first made to Fig. 3 showing a pair of beam elements 10 and 11 connected by a layer 12 of material having an elastic modulus substantially less than that of the elements 10 and 11. Assuming that the composite structure is deflected from the full-line position to the dash-line position, it will be obvious that the layer of material 12 will undergo a certain amount of shearing deformation, points on the tension side of the beam element 10 and adjacent to the layer 12 moving outwardly with respect to corresponding points on the compression side of the beam element 11. The shearing action to which the intervening connecting layer of material of lower modulus of elasticity is subjected therefore effects a transference of stress, portions of the tension stress of the beam 10 and of the compression stress of the beam 11 being partially neutralized by the shearing stress of the intervening layer 12, with the result that the outermost fiber stresses of the beams 10 and 11 will tend to balance the opposing fiber stresses and thereby effect reduction in such outermost fiber stresses. In other words, as compared to a structure where the beams 10 and 11 are independent and the intervening layer 12 is omitted, the beams being subjected to the same loading, the effect of such intervening bonding layer may be regarded as that of moving the neutral planes of individual beams inwardly so that, instead of the composite structure having a definite neutral plane, it has a neutral or modified stress zone. Thus, for the same deflection, the composite structure requires a greater force than does a pair of independent beams and less force than if the two beams were connected together as a single homogeneous structure. The composite structure has the advantage, as compared to a structure consisting of two independent beams or a single equivalent beam, of involving lower maximum stresses for the same deflection, with the result that the structure has greater durability from the point of view of fatigue endurance. Also, the intervening material, due to its lower elastic modulus and consequent greater shear deformation, is capable of functioning to absorb vibrational energy of the connected beam members, thus rendering the composite unit less susceptible to resonance build-up.

Figure 1:
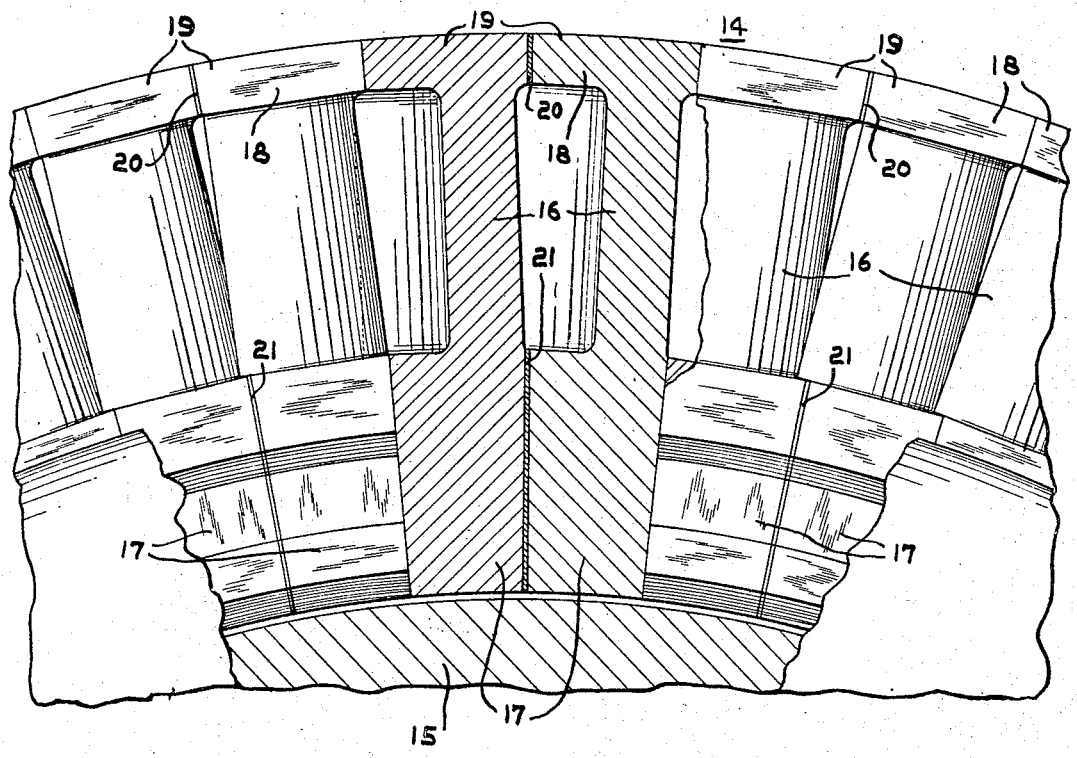
Fig. 1 is a fragmentary view showing a blade row having my improved blading.
Figure 2:
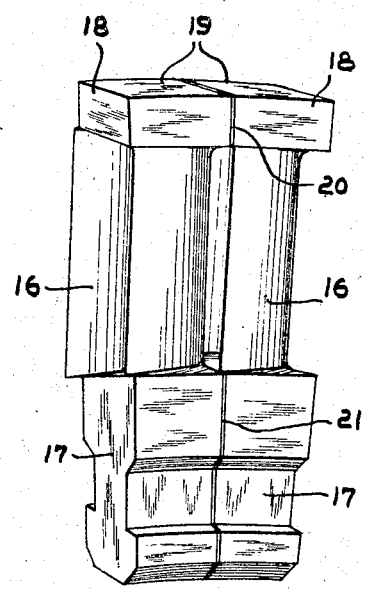
Fig. 2 is an isometric view showing one of the blade groups.

Coming now to the utilization of this principle of construction in turbine blades, in Fig. 1, there is shown a row of blades 14 carried by a blade-carrying element, such as a rotor 15, each blade comprising an active blade portion 16, a root portion 17 and a shroud portion 18. Instead of the blades 14 being carried as individual blades, they are carried as groups 19, each group being comprised by a plurality of blades 14 with the adjacent shroud and root portions bonded together by layers 20 and 21, respectively, of brazing material.

Copper, or a suitable non-ferrous alloy, is preferably used as the brazing material, not only for the reason that it has only about one-half the modulus of elasticity of steel, but it also permits of heat treatment of the groups without impairment and it is effective for the intended purposes under high-temperature conditions of operation.

The brazing material connects the blades of each group together as a single structure with the result that the natural frequency of vibration is raised and the blade roots are strengthened. Comparing a blade of a blade group to a single independent blade and regarding each to be deflected to the same extent, then it will be obvious that the stresses of the root portion of the single blade will be substantially higher than that of the blade group because the area of the latter in stress is substantially larger.

Each blade group 19 is a composite structure including blade portions 16 and composite shroud and root elements integral therewith, the composite shroud element or structure including shroud portions 18 and the layer of brazing 20 joining the adjacent faces of such portions, and the composite root element likewise including the root portions 17 and the brazing 21.

The root and shroud portions 17 and 18 are integral with the active blade portions 16 of the blades. The root and shroud portions of each blade have parts extending circumferentially in opposite direction from the blade section; and, on this account, the brazed joints are removed or spaced from the blade sections by material of the root and shroud portions, with the result that the structure is stronger than would be the case if such joints were aligned with or conformed to the blade section boundaries. Furthermore, both the root portions of individual blades and the brazed-together root constructions of individual blade groups may have end faces formed in planes extending radially of the blade row, thereby facilitating the manufacture of the blades individually and as connected groups, the assembly of the groups with the blades of a row properly spaced and the provision of stronger and more rigid connections between the rotor and the blades.

Regarding the composite shroud element of a blade group as a beam, then, if a blade thereof is deflected due to an applied force, the shroud element would be deformed and deflected with a reverse bend. It is, therefore, desirable to locate the brazed joint 20 of the shroud element or structure of each group where the bending moment, and therefore the bending stress, is at a minimum, or zero. Accordingly, the adjacent faces of the shroud portions 18 and of the root portions 17 of each group are preferably arranged in axial planes of the turbine between adjacent active blade portions 16 with the adjacent faces of the shroud portions located at a region of the composite shroud where the bending moment is at a minimum.

Figs. 4 to 7, inclusive, show the shroud portions of the blades of groups joined to form arcuate shroud structures, the joints including brazing and interlocking connections to give added strength to the latter.

Figure 5:
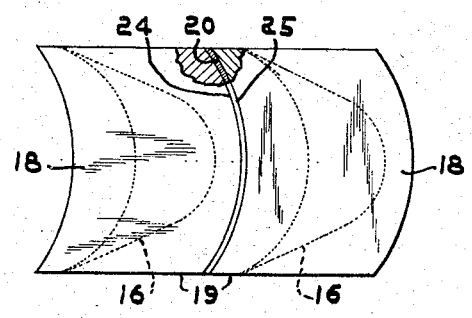
Figure 4:
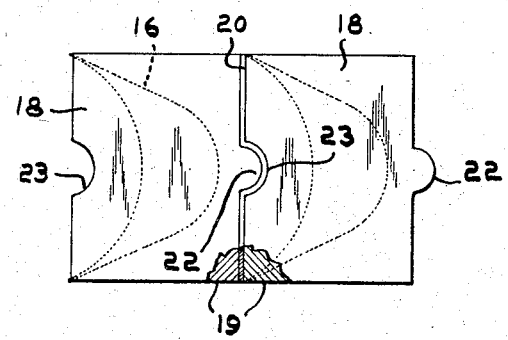

In Fig. 4, the shroud portions 18 having opposed adjacent faces joined by the brazing layer 20 are interlocked in an axial direction by a radial rib 22 formed on one shroud portion and cooperating with a groove 23 formed in the adjacent shroud portion; and, in Fig. 5, this effect is accomplished by the interfitting convex and concave faces 24 and 25 formed on the shroud portions of the group.

Figure 6:
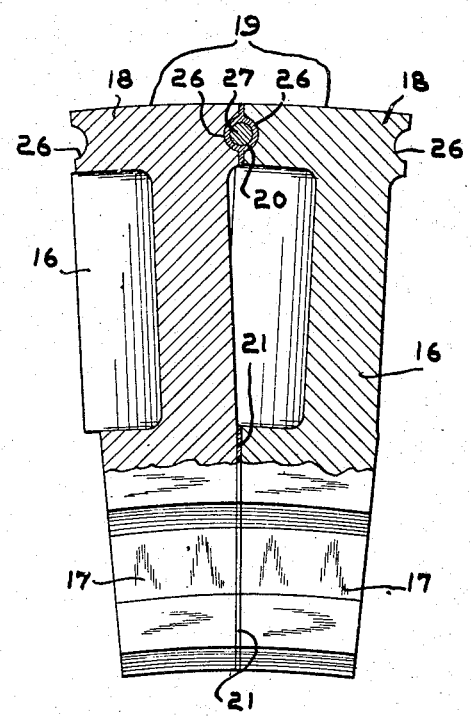
Figure 7:
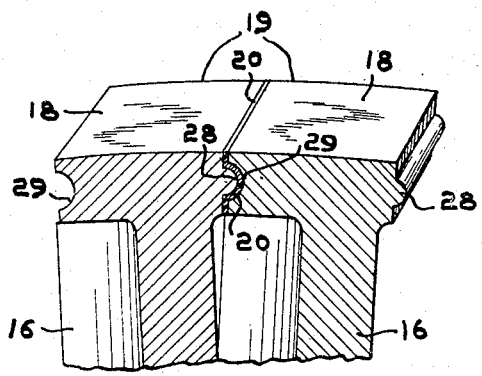

The interlocking connections may be effective in a radial direction as shown in Figs. 6 and 7. In Fig. 6, the shroud portions 18 have opposed recesses 26 and a cooperating pin 27; and, in Fig. 7, the connection embodies a rib 28 formed on one shroud portion and cooperating with a groove 29 formed in the adjacent shroud portion.

In Figs. 4 to 7, inclusive, the brazing layer 20 conforms to the adjacent and opposed shroud portion faces and the interlocking features of the shroud portions, the interlocking features serving to reenforce or strengthen the brazing either axially or radially.

Several advantages follow from the use of the construction described. Irrespective of the type of blading, a stronger and more durable construction results on account of the increase in natural frequency and the large amount of root for each blade. The shroud of each group ties together adjacent blades thereof with the result that the natural frequency is increased as compared to a similar single blade; and it is obvious that, if force is applied to a single blade portion, such force will be resisted by the composite root construction of the group. The advantages of having the blades arranged in groups are secured without involved or complicated manufacturing procedure in that each group is made up of individual blades produced in the conventional way, such individual blades being formed into unitary composite groups by brazing together the shroud and root portions of the blades of each group; and, since brazing is an essential step in the production procedure, the blade root and shroud portions of each blade are preferably so designed as to avoid the imposition of bending moments on the brazed connections of the composite shrouds of the groups, the shroud and root portions being so constructed and arranged as to present parallel faces falling in axial planes of the turbine and located at minimum or zero bending moment positions. If the brazing material has an elastic modulus substantially less than that of the blade material, then the brazing is subject to shearing deformation with the result that, for a given deflection, lower maximum stresses are encountered and the blading may operate indefinitely without fatigue under load conditions that would detrimentally affect a homogenous structure. The invention is particularly advantageous for use with the initial row of impulse blades of a turbine operating under conditions of high temperature and pressure, the group arrangement not only providing for increase in natural frequency and increased overall strength for a given loading, but the brazing facilitates manufacture without imposing any limitations to proper heat treatment after brazing. Brazing chrome steel turbine blade material with copper, for instance, is effected at a temperature somewhat in excess of 2,100° F., and it has been found that groups of blades so brazed may be subsequently heat treated at temperatures up to 1500° F. without impairment of the brazing and that such prepared blades may be operated in turbines using steam at temperatures somewhat in excess of 1000° F. without detriment to the structure.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. In an elastic-fluid turbine supplied with elastic fluid at relatively high temperature and pressure, a row of moving blades of an initial impulse stage and means for maintaining the stresses of said moving blades relatively low in relation to forces applied thereto and for increasing the natural blade frequency thereof, said means comprising the arrangement of said blades in a circumferential series of groups of blades, each blade having integral root and shroud portions arranged to provide opposed faces, and cuprous brazing material joining the opposed faces of the root and shroud portions of the blades of each group.

2. The combination as claimed in claim 1 wherein each blade group comprises a pair of blades and the brazing material is copper.

3. In a turbine, a moving row of impulse blades comprising a circumferential series of groups of blades and the blades including integral, arcuately-extending, shroud and root portions having adjacent opposed faces so that such portions provide annular structures between which the blade portions extend to define the blade passages; each group of blades including a plurality of blades and brazing for connecting the latter together; said brazing joining the opposed faces of the shroud portions of each group so as to provide an integral arcuate shroud structure; and interlocking means for the shroud portions of each arcuate shroud structure, strengthening the brazed joints of the latter, and arranged so that the brazing separates the interlocking elements.

4. The combination as claimed in claim 3 wherein the interlocking means is effective in an axial direction.

5. The combination as claimed in claim 3 wherein the interlocking means is effective in a radial direction.

6. The combination as claimed in claim 3 wherein the interlocking elements have the joint of each arcuate shroud structure comprising a cooperating rib and groove formed on adjacent shroud portions of such structure.

7. The combination as claimed in claim 3 wherein the interlocking elements comprise complementary grooves formed on adjacent shroud portions of such structure and a pin in the space defined by the complementary grooves.

EDWIN E. ARNOLD.